US009672737B2

(12) United States Patent
Bernhardt et al.

(10) Patent No.: US 9,672,737 B2
(45) Date of Patent: Jun. 6, 2017

(54) DYNAMIC MULTI-LANE CAPACITY OPTIMIZATION IN A MIXED VEHICLE ENVIRONMENT

(71) Applicant: HERE Global B.V., Veldhoven (NL)

(72) Inventors: Bruce Bernhardt, Wauconda, IL (US); Arnold Sheynman, Northbook, IL (US); Jingwei Xu, Buffalo Grove, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 14/709,954

(22) Filed: May 12, 2015

(65) Prior Publication Data

US 2016/0335890 A1 Nov. 17, 2016

(51) Int. Cl.
| | |
|---|---|
| *G08G 1/0967* | (2006.01) |
| *G01C 21/34* | (2006.01) |
| *G01C 21/36* | (2006.01) |
| *G08G 1/01* | (2006.01) |
| *G08G 1/015* | (2006.01) |
| *B60W 40/04* | (2006.01) |

(52) U.S. Cl.
CPC ....... *G08G 1/0967* (2013.01); *G01C 21/3492* (2013.01); *G01C 21/3691* (2013.01); *G08G 1/015* (2013.01); *G08G 1/0145* (2013.01); *G08G 1/096716* (2013.01); *G08G 1/096758* (2013.01); *B60W 40/04* (2013.01); *B60W 2550/30* (2013.01)

(58) Field of Classification Search
None
See application file for complete search history.

(56) References Cited

U.S. PATENT DOCUMENTS

| 5,801,943 A | 9/1998 | Nasburg | |
|---|---|---|---|
| 2004/0073356 A1* | 4/2004 | Craine | G08G 1/096716 701/117 |

(Continued)

FOREIGN PATENT DOCUMENTS

| EP | 1 580 707 A1 | 9/2005 |
|---|---|---|
| WO | WO 2013/109472 A1 | 7/2013 |

OTHER PUBLICATIONS

Kerner ("Three-phase traffic theory and highway capacity", Physica A: Statistical Mechanics and its Applications, vol. 333, Feb. 15, 2004, pp. 379-440).*

(Continued)

*Primary Examiner* — Leon-Viet Nguyen
(74) *Attorney, Agent, or Firm* — Alston & Bird LLP (57) ABSTRACT

In the example embodiments as described herein there is at least a method and apparatus to perform operations including monitoring probe data of car and truck traffic on at least one road segment including more than one lane; based on the monitoring, determining that an occurrence of a traffic jam ahead of the car and truck traffic on the at least one road segment is probable or occurring; and in response to the determining, selectively notifying at least one of a car and truck of the traffic of required or prohibited changes to at least one of their position and speed on the at least one road segment to prevent an occurrence of a traffic jam on the at least one road segment.

18 Claims, 8 Drawing Sheets

(56) References Cited

U.S. PATENT DOCUMENTS

| | | | | |
|---|---|---|---|---|
| 2007/0067086 A1* | 3/2007 | Rothschild | ........... | B60K 31/185 |
| | | | | 701/93 |
| 2012/0059574 A1* | 3/2012 | Hada | .................... | G08G 1/0112 |
| | | | | 701/119 |
| 2013/0013179 A1* | 1/2013 | Lection | ................ | G08G 1/0145 |
| | | | | 701/117 |
| 2013/0063282 A1* | 3/2013 | Baldwin | ............... | B61L 29/282 |
| | | | | 340/941 |
| 2014/0257665 A1* | 9/2014 | Kagerer | ............ | B60K 31/0008 |
| | | | | 701/96 |

OTHER PUBLICATIONS

B.S. Kerner, "Basis of Three-Phase Traffic Theory", The Physics of Traffic, Chapter 4, pp. 87-98 , 2004.
B.S. Kerner, "Definitions of the Three Traffic Phases", Introduction to Modern Traffic Flow Theory and Control: The Long Road to Three-Phase Traffic Theory, Chapter 2, pp. 9-25, 2009.
Extended European Search Report from corresponding European Patent Application No. 16169167.0 dated Oct. 4, 2016.

* cited by examiner

DYNAMIC MULTI-LANE CAPACITY OPTIMIZATION IN A MIXED VEHICLE ENVIRONMENT

TECHNICAL FIELD

The teachings in accordance with the example embodiments of this invention relate generally to dynamic multi-lane vehicle traffic optimization and, more specifically, relate to minimizing an occurrence of traffic congestion events by identifying potential road segment vehicle traffic congestion and providing guidance to prevent the congestion.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Several techniques have been used to reduce traffic delays. Generally the algorithms used attempt to reduce delays, stops, or some other traffic obstacle. In many cases the algorithms are geared towards pre-timed coordinated systems. Optimization can be using signals along a road such as signals from cameras or manual counters. In addition, due to recent advances in information technology there is now enabled real-time continuous traffic monitoring and adjustments to traffic signal timing.

For example, by placing sensors along roads, for example tracking Bluetooth and Wi-Fi devices in passing vehicles, there can be support for new solutions which can use accurately detected and recorded information regarding traffic and also using historic data for timing and to enable real-time feedback to changes. The example embodiments of the invention provides a novel approach to identifying and preventing traffic situations that can cause congestion.

SUMMARY

In an example aspect of the invention, there is a method comprising: monitoring, by a network node, probe data of car and truck traffic on at least one road segment comprising more than one lane; based on the monitoring, determining, by the network node, that an occurrence of a traffic jam ahead of the car and truck traffic on the at least one road segment is probable or occurring; and in response to the determining, selectively notifying, by the network node, at least one of a car and truck of the traffic of required or prohibited changes to at least one of their position and speed on the at least one road segment to prevent an occurrence of a traffic jam on the at least one road segment.

In another example aspect of the invention, there is an apparatus comprising: at least one processor; and at least one memory including computer program code, where the at least one memory and the computer program code are configured, with the at least one processor, to cause the apparatus to at least: monitor probe data of car and truck traffic on at least one road segment comprising more than one lane; based on the monitoring, determine that an occurrence of a traffic jam ahead of the car and truck traffic on the at least one road segment is probable or occurring; and in response to the determining, selectively notify at least one of a car and truck of the traffic of required or prohibited changes to at least one of their position and speed on the at least one road segment to prevent an occurrence of a traffic jam on the at least one road segment In another example aspect of the invention, there is an apparatus comprising: means monitoring, probe data of car and truck traffic on at least one road segment comprising more than one lane; means, based on the monitoring, for determining, by the network node, that an occurrence of a traffic jam ahead of the car and truck traffic on the at least one road segment is probable or occurring; and means, in response to the determining, for selectively notifying, by the network node, at least one of a car and truck of the traffic of required or prohibited changes to at least one of their position and speed on the at least one road segment to prevent an occurrence of a traffic jam on the at least one road segment.

In accordance with the example aspect of the invention as described in at least the paragraph above at least the means for monitoring, determining, and notifying comprises a non-transitory computer-readable medium embodying computer program code, and the computer program code executed by at least one processor.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In this invention, we propose at least a method and apparatus to identify potential road segment vehicle traffic congestion and provide guidance to prevent the congestion.

A three-phase traffic theory developed by Russian physicist Boris Kerner describes the traffic as of a three phases transition phenomena: free flow [F] and two congestion phases: synchronized flow [S] and wide moving jam [J]. In the wide moving jam phase, both flow rate and velocity drops significantly. The wide moving jam can only spontaneously occur through synchronized flow and moves upstream through other different traffic phases of free flow, synchronized flow, or highway bottlenecks. While the jam is moving, it maintains the downstream front velocity. This is the main characteristic to distinguish a wide moving jam (WMJ) from other moving jams.

The term wide reflects the fact that if a moving jam has a width (in the longitudinal road direction) considerably greater than the widths of the jam fronts, Thus the term wide does not particularly relate to a width across a traffic jam, but instead may refer to its length being considerably more than the transition zones at its head and tail.

Figure 1A:
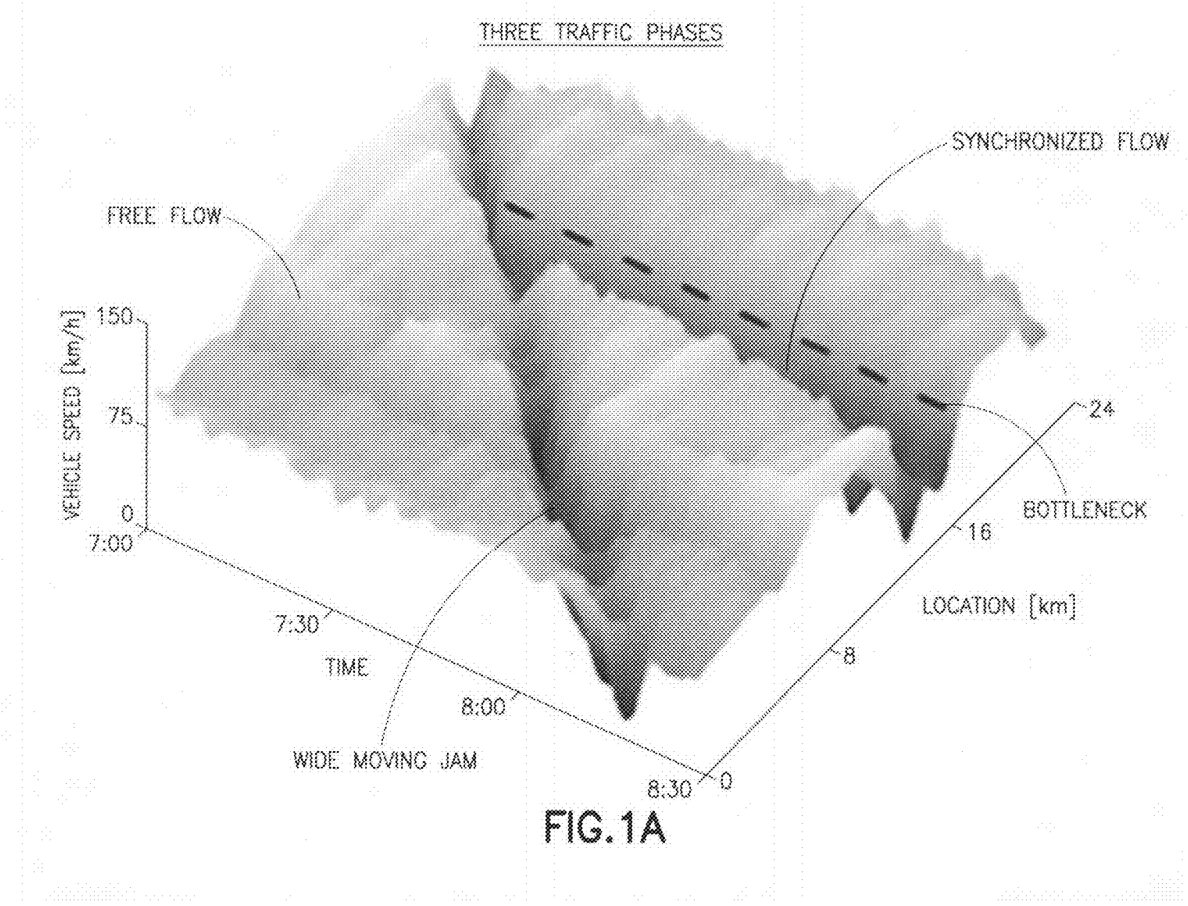
FIG. 1A shows three traffic phases with respect to vehicle speed.
Figure 1B:
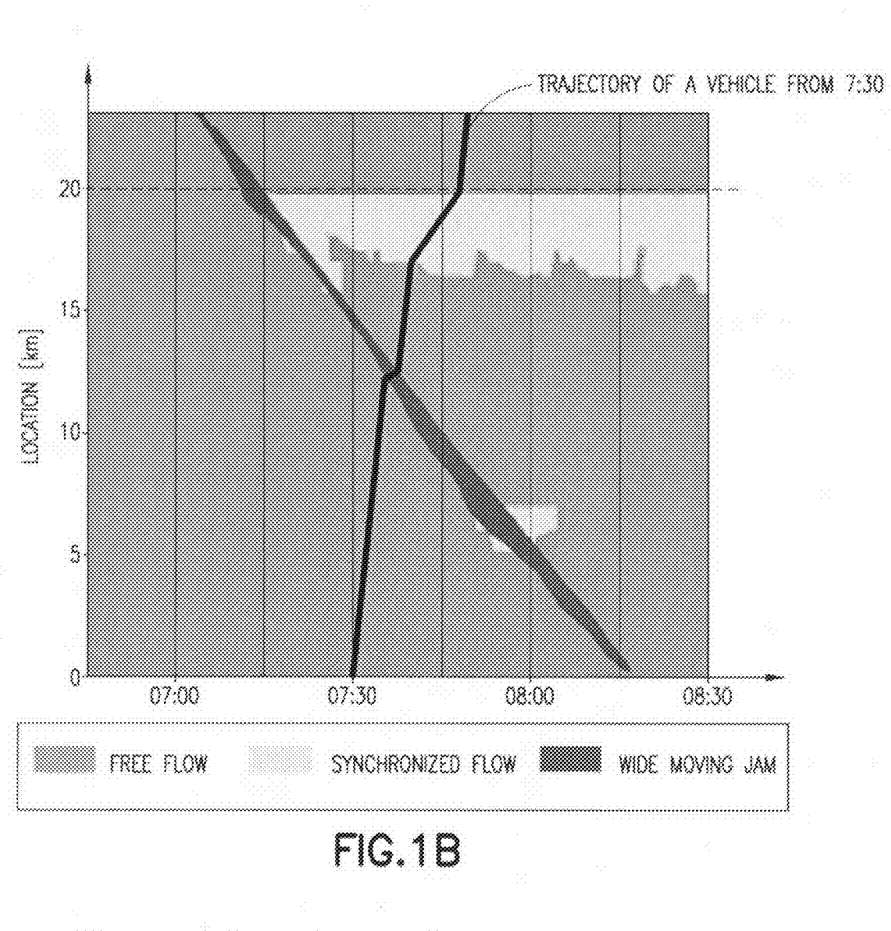
FIG. 1B shows three traffic phases with respect to vehicle location.

FIGS. 1A and 1B each illustrate the three phase definitions [S], [F], and [J] using a time-space diagram. FIG. 1A shows the three traffic phases with respect to vehicle speed, and FIG. 1B shows the three traffic phases with respect to vehicle location. As can be seen, "wide moving jam" phase darker colored propagates upstream maintaining the constant velocity of the downstream front while moving straight through both the free flow and the freeway bottleneck. In contrast, "synchronized flow" phase lighter colored has the fixed downstream front at a bottleneck.

Figure 2:
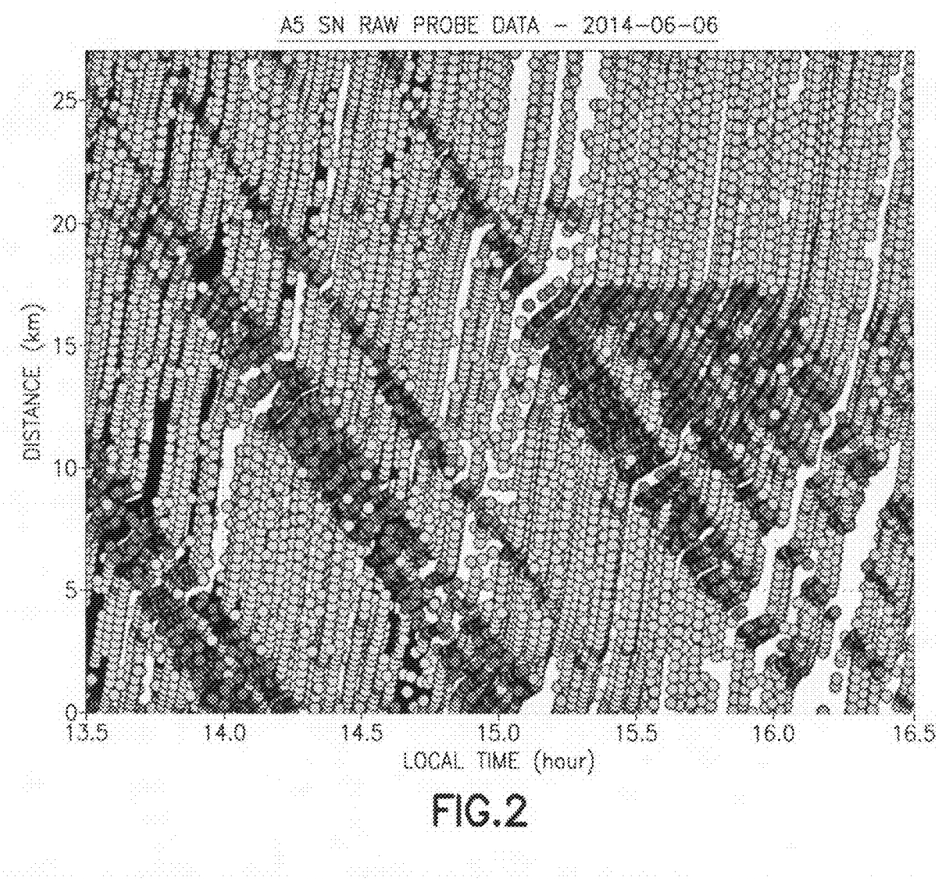
FIG. 2 shows a time space diagram of a wide moving traffic jam.

WMJ phenomena has been demonstrated in many articles using real time data. FIG. 2 shows an example of multiple WMJs using the real time probe data on a Germany A5 highway.

Introduction

The capacity of a multi-lane road is determined as a function of the number of vehicles and vehicle types for a given road segment. This capacity can vary based on road conditions and the environment such as weather conditions, curves, and inclines or descents. Large commercial vehicles have a different capacity on a road when compared to automobiles. When at or near road capacity, transient conditions can occur that further restrict the capacity of the road causing that road segment to exceed capacity resulting in congestion. This congestion, even on a small segment of road, may result in upstream road segments, even though capable of more capacity, to become congested as well as a result of being blocked from discharging the current volume downstream. The result is a jam of vehicles propagating upstream even as subsequent downstream capacity becomes available. The example embodiments of the invention work to minimize an occurrence of such events.

The resulting jam and its upstream propagation decreases the overall capacity of the road network and increases the economic costs to the public. This disclosure proposes a method to minimize the occurrence of such events by identifying the transient capacity situations and describes methods of restricting the ability for the different vehicle mixes to occur at critical points and times.

The example embodiments of the invention provide at least a method and apparatus to minimize the occurrence of such events by identifying the transient capacity situations of traffic and restricting an ability for different vehicle mixes of the traffic to occur at critical points and times.

Figure 6:
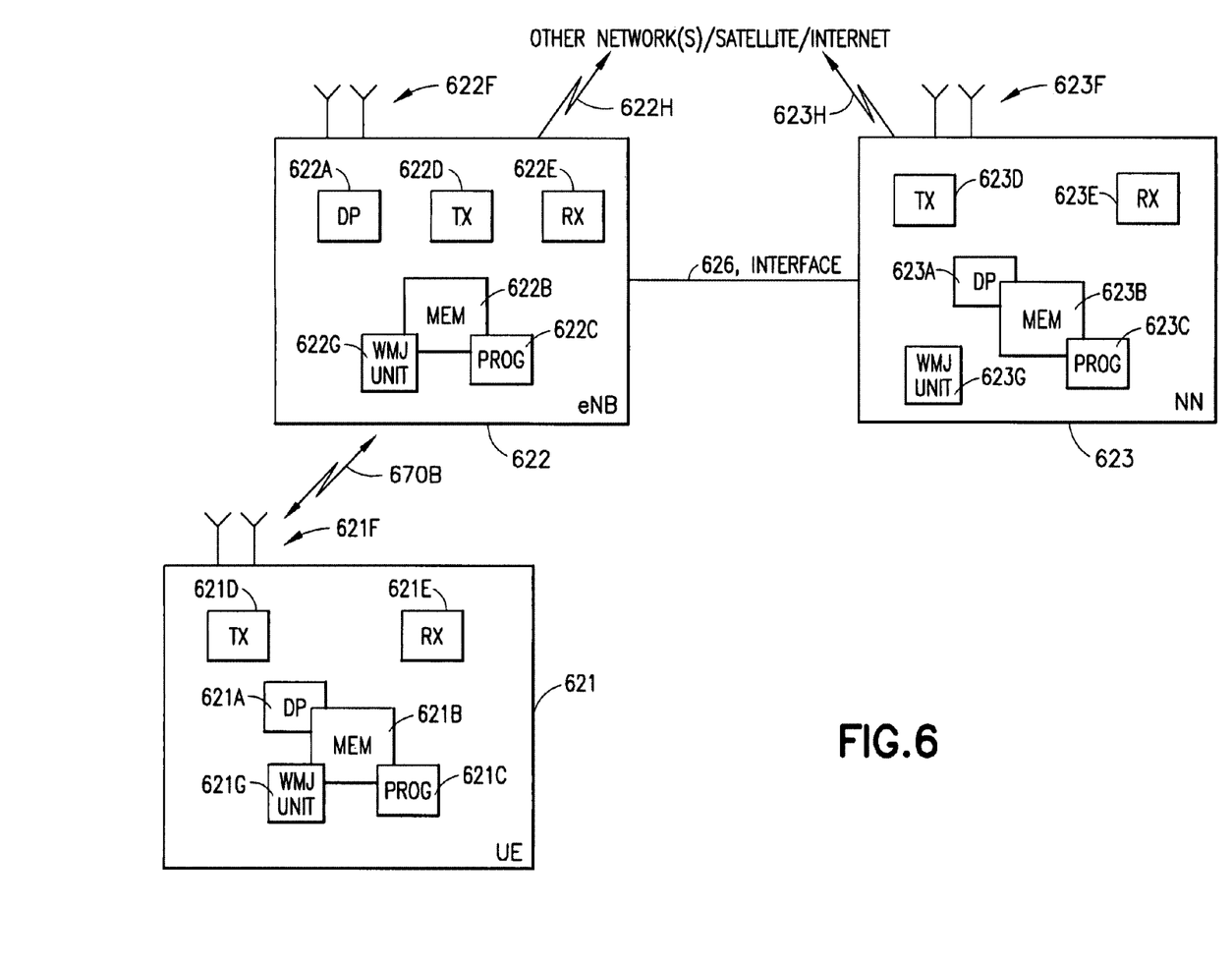
FIG. 6 is a simplified block diagram of various electronic devices that are suitable for use in practicing the example embodiments of this invention.

Before describing the example embodiments of the invention in further detail reference is now made to FIG. 6 for illustrating a simplified block diagram of various electronic devices and apparatus that are suitable for use in practicing the example embodiments of this invention. In FIG. 6 there is a first network access node/eNB 622 coupled via an interface 626 to a network node/NN 623, of which the former is shown as adapted for communication over wireless link with UE 621, such as a mobile terminal or termed more generally user equipment (UE). Either the network nodes eNB 622 or NN 623 can comprise a WMJ unit device 622G and 623G; respectively, including at least a geolocation database for use in performing WMJ operations, as in accordance with the example embodiments of the invention.

As stated above, the eNB 622 and the NN 623 may be communicatively coupled via an interface 626 to a primary network. Interface 626 can be for wireless communication via antennas 622F and 623F of the eNB 622 and the NN 623, respectively. Further, in a non-limiting embodiment the eNB 622 and the NN 623 may be coupled using interfaces 622H and 623H, respectively, which are coupled to further networks (e.g., PSTN and/or a data communications network/Internet, and/or a satellite system). The NN623 can be another network device or a higher network node. In addition, the NN623 can be located in a service provider or manufacturer network. Further, the NN623 may be incorporated into any network device such as a network base station. In addition, the NN623 can comprise a server.

The UE 621 includes processing means such as at least one data processor 621A, storing means such as at least one computer-readable memory 621B storing at least one computer program 621C, communicating means such as a transmitter TX 621D and a receiver RX 621E for bidirectional wireless communications with the eNB 622 via one or more antennas 621F. In a non-limiting embodiment, connected to at least the memory 621B and the DP 621 A of the UE 621 is a WMJ unit 621G. The UE 621 may operate the WMJ 621G to at least detect traffic in accordance with the example embodiments, and to process a WMJ notification, such as notifications regarding directions and/or operations to prevent/reduce traffic congestion, as in accordance with the example embodiments of the invention. In accordance with the example embodiments of the invention the antennas 621F may be configured with the DP 621A to transmit information regarding the detected traffic, and configured to receive the notifications regarding directions and/or operations to prevent/reduce traffic congestion.

The network node or eNB 622 also includes processing means such as at least one data processor 622A, storing means such as at least one computer-readable memory 622B storing at least one computer program 622C, and communicating means such as a transmitter TX 622D and a receiver RX 622E for bidirectional wireless communications, such as with its associated UE 621, via one or more antennas 622F. The eNB 622 also can be configured to process WMJ notifications, such as to process and transmit notifications regarding directions and/or operations to prevent/reduce traffic congestion, as in accordance with the example embodiments of the invention.

Electronic devices implementing various aspects of the invention need not be the entire UE 621, eNB 622, and/or NN 623, but example embodiments may be implemented by one or more components of same such as the above described tangibly stored software, hardware, firmware and DP, or a system on a chip SOC or an application specific integrated circuit ASIC or a digital signal processor DSP or a modem or a subscriber identity module commonly referred to as a SIM card.

Various embodiments of the UE 621 can include, but are not limited to: cellular telephones; data cards, USB dongles, personal portable digital devices having wireless communication capabilities including but not limited to laptop/palmtop/tablet computers, digital cameras and music devices, e-readers and Internet appliances. Other embodiments of the described UE 621 may be implemented as a M2M device which may not have a user interface directly but instead be remotely disposed for user-free operation.

Various embodiments of the computer readable MEM 621B, 622B and 623B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 621A, 622A and 623A include but are not limited to general purpose computers, special purpose computers, microprocessors, digital signal processors (DSPs) and multi-core processors.

The example embodiments of the invention comprises at least the steps of
1. Collecting information of vehicles' location and speed on the predetermined parts of the road;
2. Periodically verifying existence of slow and fast moving vehicle clusters on said parts of the road;
3. In anticipation of potential congestion restricting vehicles belonging to said slow moving vehicle cluster from lane change; and/or
4. Cancelling said restriction.

Further details regarding the example embodiments of the invention are described below:
1.
   a. Due to different lengths, acceleration/deceleration response times, and in some scenarios, different government mandated speed limits for different classifications of vehicles a road segment will have varying capacities based on the vehicle mix. These capacities are typically calculated on a per lane basis and one common method of increasing the capacity of a road segment is to increase the number of available lanes. The additional lanes may only be needed at certain times of the day and an increased cost of road construction results from the need to handle the peak capacities. All vehicle types may use all lanes and the capacity calculations should take into account at least amounts of a mix of different vehicle types which are using each lane and any mandated speed limits for these vehicles in the lanes, . . . (e.g., MIX CONSIDERATION);
   b. Another capacity optimization technique is to consider lanes that may be required to be limited to a classification of vehicle, for example certain lanes may be considered static truck lanes. Further, there is taking into account lanes on which traffic is stalled or static, and the classifications of vehicles in these lanes. . . . (e.g., STATIC TRUCK LANES);
   c. Vehicle (Truck/Car) mix throughout the day,
   d. Proposed optimization:
      i. Based on continuous probe/sensor input monitor a road segment to determine if bi-modal (multi-modal) traffic exists. If exists, determine the truck/car mix and estimate a current and future capacity of the road segment. . . . (e.g., PREDICTIVE):
      ii. One cause of moving jam creation in 3 phase traffic theory is the temporary capacity reduction of a road segment due to trucks or similar vehicles utilizing an additional lane to slowly overtake another vehicle.
      iii. When a road segment is near capacity the further reduction in capacity from the overtaking vehicle operating at a speed below the free flow speed causes congestion to occur, backing up the upstream road segments;
2. Notification of WMJ and estimating the capacity reduction needed to prevent an additional occurrence:
   a. Estimate the probability of a wmj and determine the balance of cars/trucks on a per lane basis needed to prevent the occurrence or to quickly disperse the occurrence if one is not prevented;

3. Restriction algorithm description:
   a. Send a message to trucks that there will be a period of no passing on a given road segment up ahead to prevent/reduce congestion. Indicate the location on the road where the capacity is expected to increase and that overtaking will again be allowed
   b. Restrict larger vehicles to a more limited speed range to a period of time to ensure the need for overtaking is reduced;
4. Notification method:
   The notification of such restriction can be delivered to end customer through RDS messages over the air radio interface or though TPEG service by connected HTTP or UDP protocol. In accordance with an example embodiment the notification can be using signaling sent via the HTTP or UDP protocol to a driver of the at least one of the car and truck of the traffic, and/or the notifying may also be accomplished using roadside displays or signs. Such displays or signs may be dynamically configured, such as by signaling from a device of FIG. 6, to change their messages to notify drivers of restrictions for congestion avoidance. For example, the message of a display may be configured to read something like "Trucks are prohibited from passing for the next [x] km [or miles] to reduce congestions."

Figure 3:
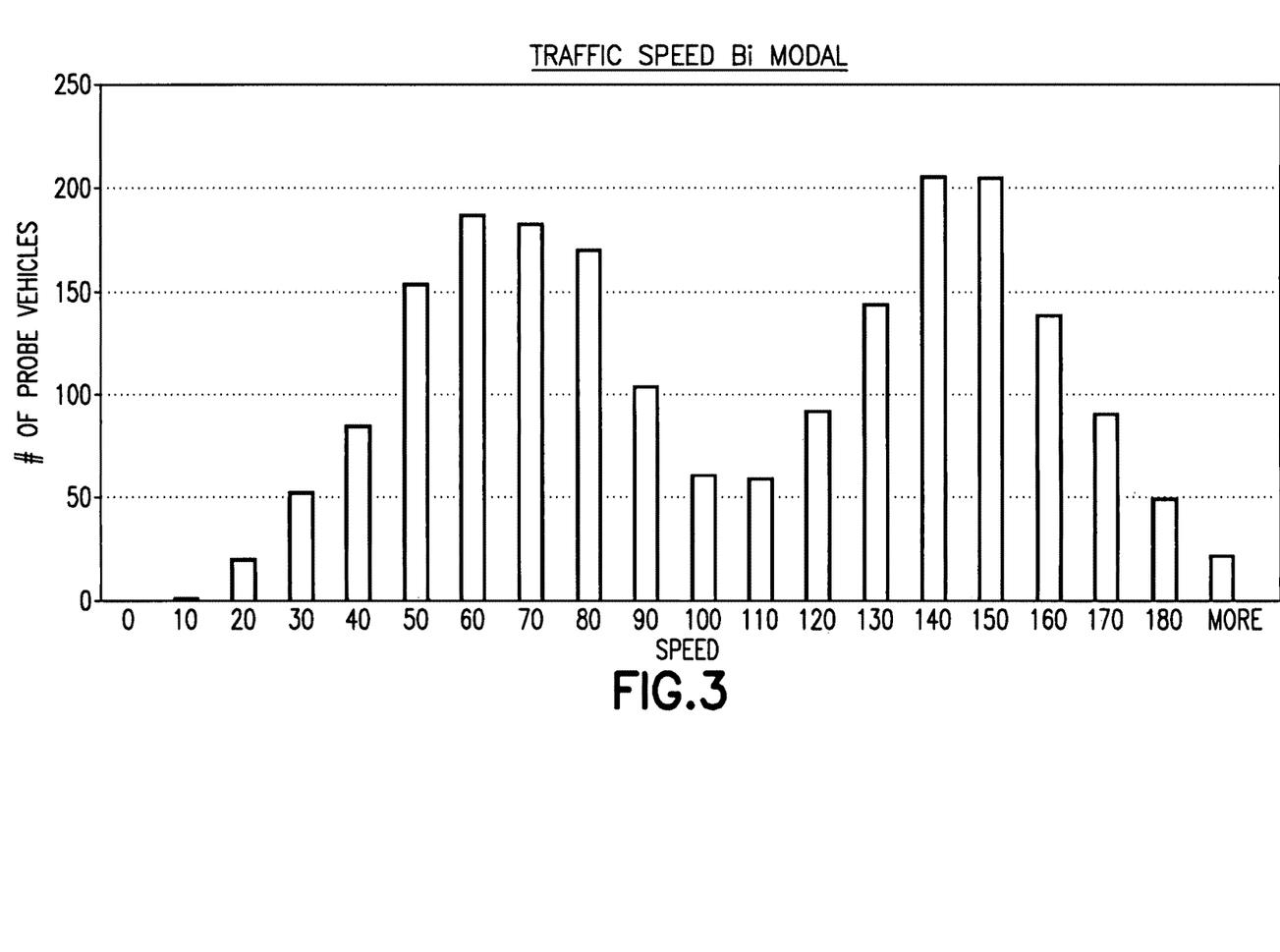
FIG. 3 shows a bar chart regarding road traffic bi-modal speed.

FIG. 3 shows a bar chart regarding road traffic bi-modal speed. FIG. 3 shows a relationship between traffic speed and a number of vehicles moving at the traffic speed.

Figure 4:
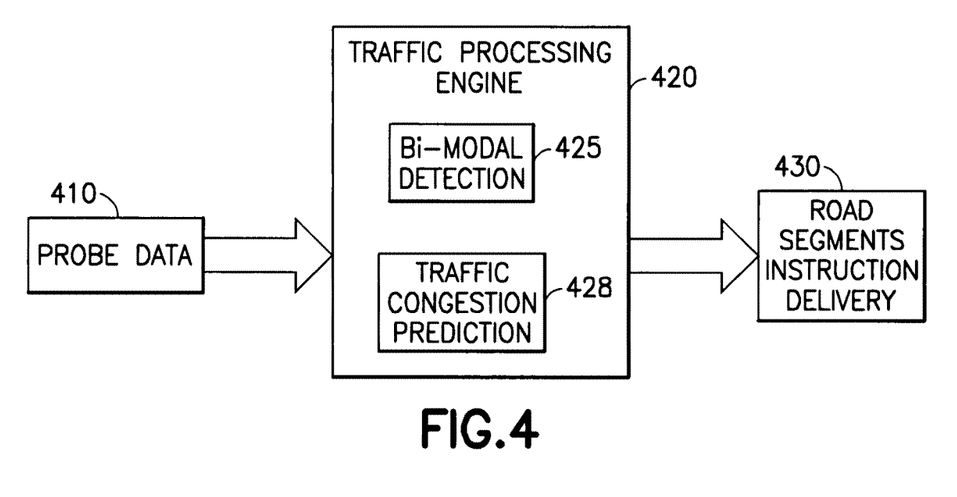
FIG. 4 shows a road traffic optimization system in accordance with an example embodiment of the invention.

FIG. 4 shows a road traffic optimization system in accordance with an example embodiment of the invention. As shown in block 410 of FIG. 4 there is obtaining/providing probe traffic data from one or more vehicles and/or from a satellite. The probe data is provided to the traffic processing engine 420 where there can be bi-modal detection 425 and traffic congestion prediction 428. Then the traffic processing engine 420 is used by the road segments instruction delivery processing block 430 to provide notifications regarding directions and/or operations to prevent/reduce traffic congestion as in accordance with example embodiments of the invention.

Figure 5:
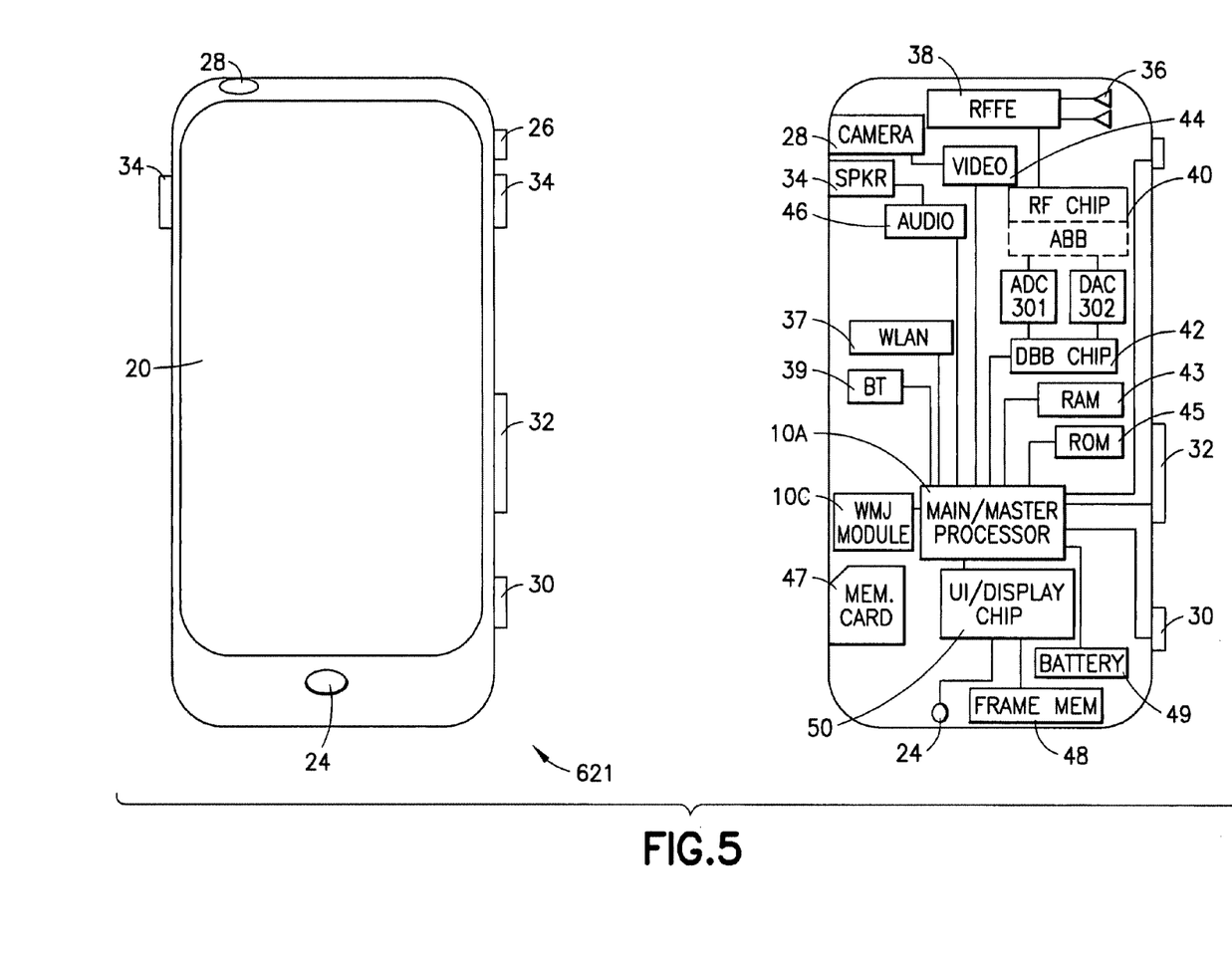
FIG. 5 shows a schematic diagram in plain view (left) and sectional view (right) of a mobile handset capable of performing operations according to an example embodiment of the invention.

FIG. 5 shows a schematic diagram in plain view (left) and sectional view (right) of a mobile handset capable of performing operations according to an example embodiment of the invention. The mobile handset may be a UE 621 as shown in FIG. 6. The UE 621 in both plan view (left) and sectional view (right) which may be configured to perform the operations in accordance with the example embodiments. As shown in FIG. 3, the UE 621 includes a graphical display interface (e.g., touchscreen) 20 and a user interface that comprises a microphone 24 and speaker(s) 34 and touch-screen technology at the graphical display interface 20 and/or voice-recognition technology for audio signals received at the microphone 24. A power actuator 26 controls the UE 621 being turned on and/or off by the user. The UE 621 may include a camera(s) module 28, which is shown as forward facing (e.g., for video calls) but may alternatively or additionally be rearward facing (e.g., for capturing images and video for local storage). The camera(s) 28 may be controlled by a shutter actuator 30 and optionally by a zoom actuator 32, which may alternatively function as a volume adjustment for the speaker(s) 34 when the camera 28 is not in an active mode. Signals to and from the camera(s) 28 pass through an image/video processor (video) 44, which encodes and decodes the image data (e.g., image frames). A separate audio processor 46 may also be present to control signals to and from the speakers (spkr) 34 and the microphone 24. The graphical display interface 20 is refreshed from a frame memory (frame mem) 48 as controlled by a user GPU 50, which may process signals to and from the display interface 20. These actuators may also be implemented using touch-screen technology.

Also within the sectional view of FIG. 5 are seen multiple transmit/receive antennas 36 that are typically used for wireless communication (e.g., cellular communication). The antennas 36 may be multi-band for use with other radios in the UE. The operable ground plane for the antennas 36 may span the entire space enclosed by the UE housing, though in some embodiments the ground plane may be limited to a smaller area, such as disposed on a printed wiring board on which a RF front-end (RFFE) 38 is formed. The RFFE 38 controls power amplification on the channels being transmitted on and/or across the antennas that transmit simultaneously, where spatial diversity is used. The RFFE 38 outputs to the radio frequency (RF) chip 40, which amplifies, demodulates and down converts the signal for analog baseband (ABB) processing. The analog to digital converter (ADC) 301 converted analog signal to bit-stream, which the digital baseband (DBB) chip 42 detects and finally decoded. Similar processing occurs in reverse for signals generated in the UE 621 and transmitted from the UE.

Functions associated with, but not limited to, the probing and notification operations to prevent/reduce traffic congestion as in accordance with example embodiments of the invention may be performed by the UE 621 such as using the WMJ module 10C of FIG. 5. The UE 621 may perform traffic probing and communication, and/or provide data to the network node for performing the operations in accordance with the example embodiments as described herein.

The DBB and/or RFIC may also include any of a processor and a memory including computer program code, which controlling transceivers parameters to optimize performance of it. Program code could be storage to memory and it may include algorithms and/or lookup tables (LUT). In addition, it is noted that the placement of any of these components are not limiting and any of the components shown in FIG. 5 may be placed differently and still operate in accordance with the example embodiments. As an example, the ADC and DAC could be on the RFIC side or in the BB side or they even could be separate from both. It is noted that any of the configuration shown in FIG. 5 is not limiting to operations performed in accordance with the example embodiments of the invention.

Certain example embodiments of the UE 621 may also include one or more secondary radios such as a wireless local area network radio (WLAN) 37 and/or a Bluetooth radio (BT) 39, which may incorporate one or more on-chip antennas or be coupled to one or more off-chip antennas. Throughout the UE 621 are various memories 125, such as a random access memory (RAM) 43, a read only memory (ROM) 45, and, in some example embodiments, a removable memory such as the illustrated memory card 47. In some example embodiments, various programs (such as computer program code 315) are stored on the memory card 47. The components within the UE 621 may be powered by a portable power supply such as a battery 49.

Figure 7:
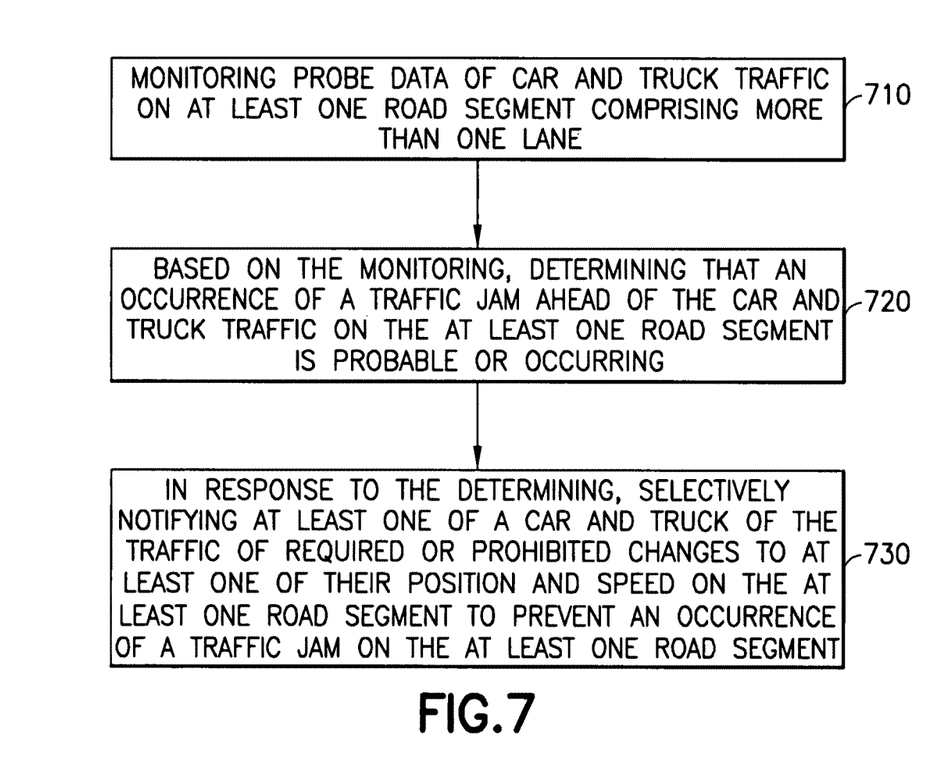
FIG. 7 is a logic flow diagrams illustrating the operation of a method, and a result of execution of computer program instructions embodied on a computer readable memory, for practicing example embodiments of this invention.

FIG. 7 illustrates operations which may be performed by a network device such as, but not limited to, a network device (e.g., the NN 623, eNB 622, and/or UE 621 as in FIG. 6). As shown in step 710 of FIG. 7A, there is monitoring probe data of car and truck traffic on at least one road segment comprising more than one lane. At step 720 of FIG. 7 there is based on the monitoring, determining that an occurrence of a traffic jam ahead of the car and truck traffic on the at least one road segment is probable or occurring. Then at step 730 of FIG. 7 there is in response to the determining, selectively notifying at least one of a car and truck of the traffic of required or prohibited changes to at least one of their position and speed on the at least one road segment to prevent an occurrence of a traffic jam on the at least one road segment.

In accordance with some embodiments as described in the paragraph above, the estimating comprises determining a ratio of cars and trucks of the traffic and estimating a current traffic capacity of the at least one road segment.

In accordance with some embodiments as described in the paragraphs above, the current traffic capacity of the at least one road segment is estimated on a per lane basis of the more than one lane.

In accordance with some embodiments as described in the paragraphs above, the determining the occurrence of the traffic jam ahead of the car and truck traffic on the at least one road segment is probable comprises determining a change of the ratio of cars and trucks of the traffic on the per lane basis.

In accordance with some embodiments as described in the paragraphs above, the determining the occurrence of a traffic jam ahead of the car and truck traffic on the at least one road segment is probable takes into account changes in a free flow phase, a synchronized flow phase, and a wide moving jam phase of the car and truck traffic on the at least one road segment.

In accordance with some embodiments as described in the paragraphs above, the monitoring traffic comprises collecting information of varying speeds of different vehicles of said car and truck traffic on the per lane basis.

In accordance with some embodiments as described in the paragraphs above, the selectively notifying comprises restricting trucks or large vehicles of the traffic from performing at least one of a change of position to another part of the more than one lane, and from changing a speed to be outside a predetermined speed limit.

In accordance with some embodiments as described in the paragraphs above, the notifying is performed using at least one of a radio data system message to the car and truck traffic over an air radio interface, and a transport protocol experts group service over an HTTP or UDP protocol, and wherein the notifying is using the radio data system message sent via the HTTP or UDP protocol to at least one of the at least one of the car and truck of the traffic to notify a driver, and a sign or display of the at least one road segment to configure the sign or display with the notification.

In accordance with some embodiments as described in the paragraphs above, the probe data comprises traffic data of the at least one road segment, and wherein the probe data is received by the network node from at least one of a satellite and at least one of a car and a truck of the at least one road segment.

In accordance with an embodiment of the invention as described above there is an apparatus comprising: means monitoring [DP 623A, DP 622A, and/or DP 621A], by a network node [NN 623, eNB 622, and/or UE 621], probe data of car and truck traffic on at least one road segment comprising more than one lane. There is means, based on the monitoring, for determining [DP 623A, DP 622A, and/or DP 621A], by the network node, that an occurrence of a traffic jam ahead of the car and truck traffic on the at least one road segment is probable or occurring. Further, there is means, in response to the determining, for selectively notifying [DP 623A, DP 622A, and/or DP 621A], by the network node, at least one of a car and truck of the traffic of required or prohibited changes to at least one of their position and speed on the at least one road segment to prevent an occurrence of a traffic jam on the at least one road segment.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "example" is used herein to mean "serving as an example, instance, or illustration." Any embodiment described herein as "example" is not necessarily to be construed as preferred or advantageous over other embodiments. All of the embodiments described in this Detailed Description are example embodiments provided to enable persons skilled in the art to make or use the invention and not to limit the scope of the invention which is defined by the claims.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   monitoring probe data of car and truck traffic on at least one road segment comprising more than one lane;
   based on the monitoring, determining, by a network node, a probability of a traffic jam occurring ahead of the car and truck traffic on the at least one road segment, wherein determining the probability of a traffic jam occurring ahead of the car and truck traffic on the at least one road segment comprises determining a ratio of cars to trucks of the traffic and estimating a current traffic capacity of the at least one road segment given the determined ratio;
   determining a balance of cars and trucks on a per lane basis on the at least one road segment needed to prevent the occurrence of the traffic jam or to disperse the traffic jam should it occur; and
   in response to the determining, selectively notifying, by the network node, at least one of a car and truck of the traffic of required or prohibited changes to at least one of their position and speed on the at least one road segment to prevent or disperse an occurrence of a traffic jam on the at least one road segment.

2. The method according to claim 1, wherein the current traffic capacity of the at least one road segment is estimated on a per lane basis of the more than one lane.

3. The method according to claim 2, wherein determining the probability of a traffic jam occurring ahead of the car and truck traffic on the at least one road segment comprises determining a change of the ratio of cars and trucks of the traffic on the per lane basis.

4. The method according to claim 2, wherein determining the probability of a traffic jam occurring ahead of the car and truck traffic on the at least one road segment takes into account changes in a free flow phase, a synchronized flow phase, and a wide moving jam phase of the car and truck traffic on the at least one road segment.

5. The method according to claim 2, wherein the monitoring traffic comprises collecting information of varying speeds of different vehicles of said car and truck traffic on the per lane basis.

6. The method according to claim 1, wherein the selectively notifying comprises restricting trucks or large vehicles of the traffic from performing at least one of a change of position to another part of the more than one lane, and from changing a speed to be outside a predetermined speed limit.

7. The method according to claim 1, wherein the notifying is performed using at least one of a radio data system message to the car and truck traffic over an air radio interface, and a transport protocol experts group service over a Hypertext Transfer Protocol (HTTP) or Universal Datagram Protocol (UDP), and wherein the notifying is using the radio data system message sent via the HTTP or UDP protocol to at least one of the at least one of the car and truck of the traffic to notify a driver, and a sign or display of the at least one road segment to configure the sign or display with the notification.

8. The method according to claim 1, wherein the probe data comprises traffic data of the at least one road segment, and wherein the probe data is received by the network node from at least one of a satellite and at least one of a car and a truck of the at least one road segment.

9. The method according to claim 1 performed by a non-transitory computer-readable medium embodying computer program code, and the computer program code executed by at least one processor.

10. An apparatus comprising:

at least one processor; and at least one memory including computer program code, where the at least one memory and the computer program code are configured, with the at least one processor, to cause the apparatus to at least:

monitor probe data of car and truck traffic on at least one road segment comprising more than one lane;

based on the monitoring, determine a probability of a traffic jam occurring ahead of the car and truck traffic on the at least one road segment, wherein causing the apparatus to determine the probability of a traffic jam occurring ahead of the car and truck traffic on the at least one road segment comprises causing the apparatus to determine a ratio of cars to trucks of the traffic and estimate a current traffic capacity of the at least one road segment given the determined ratio;

determine a balance of cars and trucks on a per lane basis on the at least one road segment needed to prevent the occurrence of the traffic jam or to disperse the traffic jam should it occur; and in response to the determining, selectively notify at least one of a car and truck of the traffic of required and prohibited changes to at least one of their position and speed on the at least one road segment to prevent or disperse an occurrence of a traffic jam on the at least one road segment.

11. The apparatus according to claim 10, wherein the current traffic capacity of the at least one road segment is estimated on a per lane basis of the more than one lane.

12. The apparatus according to claim 11, wherein causing the apparatus to determine the probability of a traffic jam ahead of the car and truck traffic on the at least one road segment comprises determining a change of the ratio of cars and trucks of the traffic on the per lane basis.

13. The apparatus according to claim 11, wherein the determining the occurrence of a traffic jam ahead of the car and truck traffic on the at least one road segment is probable takes into account changes in a free flow phase, a synchronized flow phase, and a wide moving jam phase of the car and truck traffic on the at least one road segment.

14. The apparatus according to claim 11, wherein the monitoring traffic comprises collecting information of varying speeds of different vehicles of said car and truck traffic on the per lane basis.

15. The apparatus according to claim 10, wherein the selectively notifying comprises restricting trucks or large vehicles of the traffic from performing at least one of a change of position to another part of the more than one lane, and from changing a speed to be outside a predetermined speed limit.

16. The apparatus according to claim 10, wherein the notifying is performed using at least one of a radio data system message to the car and truck traffic over an air radio interface, and a transport protocol experts group service over a Hypertext Transfer Protocol (HTTP) or Universal Datagram Protocol (UDP), and wherein the notifying is using the radio data system message sent via the HTTP or UDP protocol to at least one of the at least one of the car and truck of the traffic to notify a driver, and a sign or display of the at least one road segment to configure the sign or display with the notification.

17. The apparatus according to claim 10, wherein the probe data comprises traffic data of the at least one road segment, and wherein the probe data is received by the network node from at least one of a satellite and at least one of a car and a truck of the at least one road segment.

18. The apparatus according to claim 10 embodying a base station.

* * * * *

UNITED STATES PATENT AND TRADEMARK OFFICE
CERTIFICATE OF CORRECTION

PATENT NO. : 9,672,737 B2
APPLICATION NO. : 14/709954
DATED : June 6, 2017
INVENTOR(S) : Bernhardt et al.

Page 1 of 1

It is certified that error appears in the above-identified patent and that said Letters Patent is hereby corrected as shown below:

On the Title Page

Item (71) Applicant, "Veldhoven (NL)" should read --Eindhoven (NL)--;
Item (72) Inventors, "Northbook, IL (US)" should read --Northbrook, IL (US)--.

Signed and Sealed this
Twelfth Day of June, 2018

Andrei Iancu
*Director of the United States Patent and Trademark Office*